United States Patent [19]

Estevez-Alcolado de Holl et al.

[11] Patent Number: 5,655,018
[45] Date of Patent: Aug. 5, 1997

[54] TELEPHONE HANDSET WITH AN INTEGRATED VOLUME ACTUATOR

[75] Inventors: Sonia Mercedes Estevez-Alcolado de Holl, Holmdel; Donald A. Palaski, Tinton Falls; Dhirendra Patel, Jersey City, all of N.J.

[73] Assignee: Lucent Technologies Inc., Murray Hill, N.J.

[21] Appl. No.: 667,351

[22] Filed: Jun. 21, 1996

Related U.S. Application Data

[63] Continuation of Ser. No. 346,119, Nov. 29, 1994, abandoned.

[51] Int. Cl.$^6$ .......................................... H04M 1/00
[52] U.S. Cl. ................................ 379/433; 379/434
[58] Field of Search ............................ 379/433, 434, 379/428, 429, 368, 367, 370; 264/277; 455/89, 90

[56] References Cited

U.S. PATENT DOCUMENTS

| | | | |
|---|---|---|---|
| 3,372,246 | 3/1968 | Knuepfer | 379/368 |
| 5,371,790 | 12/1994 | Nevo et al. | 379/433 |
| 5,461,672 | 10/1995 | Enokido et al. | 379/433 |

FOREIGN PATENT DOCUMENTS

| | | | |
|---|---|---|---|
| 6-268548 | 9/1994 | Japan | 379/428 |

OTHER PUBLICATIONS

"Soft-touch Undermolding Program for AT&T Cordless Phone", GE Plastics Fabrication Technology PPDC, Internal Technical Report, Mar. 1, 1993.

*Primary Examiner*—Jack K. Chiang

[57] ABSTRACT

A telephone handset having a volume actuator. The telephone handset includes a casing and a band formed from a resilient material. The band includes a molded portion that forms the volume actuator. The band encircles the telephone handset and is undermolded to the casing such that it is permanently affixed thereto. Thus, the volume actuator becomes an integral part of the telephone handset. A recess is defined between the band and the casing. An electric switch is disposed in this recess. Force transmitted to the volume actuator is transferred through the resilient material of the band and actuates the electrical switch in the recess. This force may cause the switch to either raise or lower the volume of the telephone handset.

14 Claims, 3 Drawing Sheets

TELEPHONE HANDSET WITH AN INTEGRATED VOLUME ACTUATOR

This is a continuation of application Ser. No. 08/346,119 filed Nov. 29, 1994, now abandoned.

BACKGROUND OF THE INVENTION

1. Field of the Invention

The present invention relates to a telephone handset and, more particularly, to an improved volume actuator which is integral to the telephone handset so as to reduce time and expense during manufacturing and assembly of the telephone handset.

2. Related Art

A telephone handset (used for example with a cellular telephone) typically has a handset casing that houses a transceiver and receiver to allow communication between two points. Conventional telephone handsets oftentimes have a volume adjustment mechanism (also referred to as a volume switch actuator). The volume adjustment mechanism is manufactured separately from the telephone handset casing. That is, it is a separate and distinct part. The telephone handset casing and the volume adjustment mechanism are assembled together to form a single unit. This type of assembly, however, has a variety of drawbacks.

Conventional volume adjustment mechanisms are mechanical parts that are constructed using multiple pieces that require assembly. Additionally, conventional telephone handsets require a mechanism for attaching the volume adjustment mechanism to the handset casing. Assembling the volume adjustment mechanism and attaching it to the handset casing is a time consuming process. Accordingly, it would be desirable to have a telephone handset which includes a volume adjustment mechanism that can be assembled in a easier, more efficient manner.

SUMMARY OF THE INVENTION

A telephone handset having a volume actuator. The telephone handset includes a plastic casing and a band formed from a resilient material. The band includes a molded portion that forms the volume actuator. The band encircles the telephone handset and is undermolded to the casing such that it is permanently affixed thereto. Thus, the volume actuator becomes an integral part of the telephone handset. A recess is defined between the band and the casing. An electric switch is disposed in this recess. Force transmitted to the volume actuator is transferred through the resilient material of the band and actuates the electrical switch in the recess. This force may cause the electrical switch to either raise or lower the volume of the telephone handset. The present invention saves time and money in the manufacturing and assembly of telephone handsets.

BRIEF DESCRIPTION OF THE DRAWINGS

The foregoing and other features and advantages of the invention will be apparent from the following, more particular description of a preferred embodiment of the invention, as illustrated in the accompanying drawings.

DETAILED DESCRIPTION OF THE DRAWINGS

A preferred embodiment of the present invention is now described with reference to the figures where like reference numbers indicate identical or functionally similar elements. Also in the figures, the left most digit of each reference number corresponds to the figure in which the reference number is first used. While specific configurations and arrangements are discussed, it should be understood that this is done for illustrative purposes only. A person skilled in the relevant art will recognize that other configurations and arrangements can be used without departing from the spirit and scope of the invention. It will be apparent to a person skilled in the relevant art that this invention can also be employed in a variety of other devices and applications.

Figure 1:
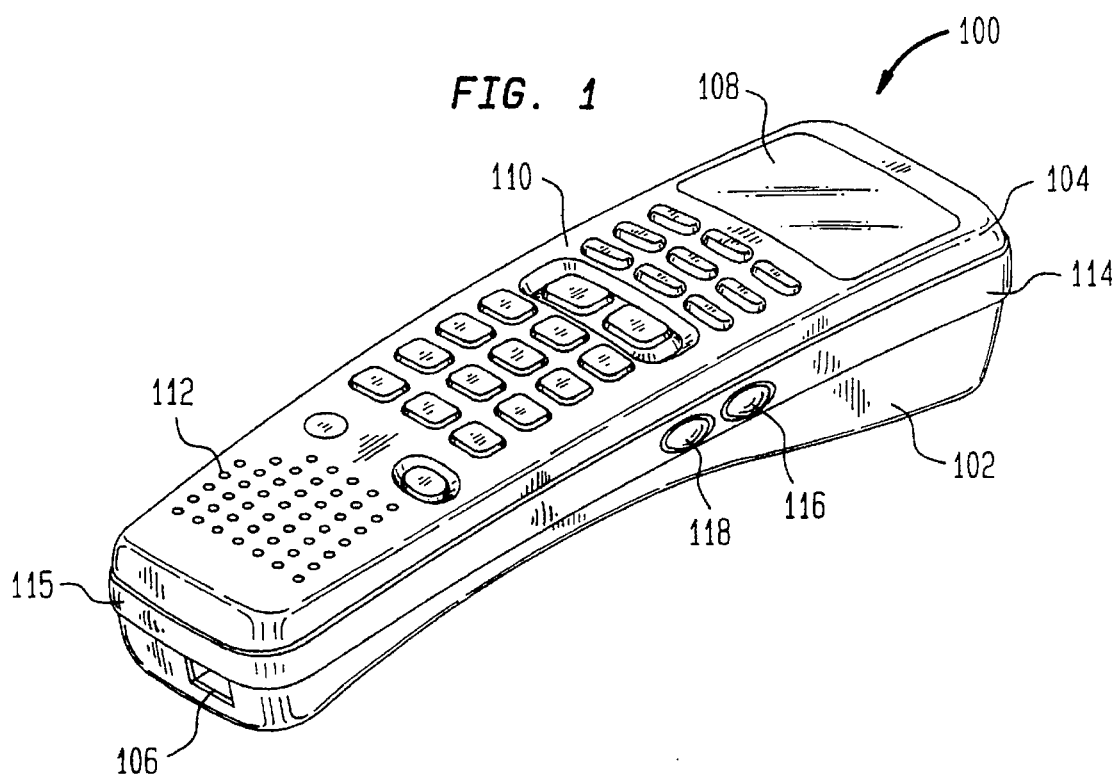
FIG. 1 is a top perspective view of a telephone handset.

FIG. 1 is a top perspective view of a telephone handset 100. Telephone handset 100 is constructed of a lower casing 102 and an upper casing 104. Lower casing 102 and upper casing 104 are attached by snapping or screwing the two pieces together. However, lower casing 102 and upper casing 104 can be attached by other mechanisms as would be apparent to those skilled in the art. When combined, lower casing 102 and upper casing 104 house a telephone assembly (not shown) including a telephone receiver and a telephone transceiver. In the preferred embodiment, the casing members are formed using injection molded plastic. In the preferred embodiment, CYCOLOY™, a polycarbonate/ABS blend made by GE Plastics in Pittsfield, Mass., is used for the plastic. However, in an alternate embodiment, a pure polycarbonate could be used.

Lower casing 102 has a plug opening 106 at one end through which an electrical cord (not shown) fits to connect telephone handset 100 to a plastic base or a transceiver unit with a base (not shown). Upper casing 104 houses an LCD assembly 108 and a keypad assembly 110. LCD assembly 108 displays information to a user, including numbers dialed. Keypad assembly 110 allows the user to dial numbers (not shown) to communicate with an outside source. Speaker holes 112 are formed in upper casing 104 below keypad assembly 110. Speaker holes 112 allow sound from pressing keypad assembly 110 to disseminate to the user. Speaker holes 112 also allow telephone handset 100 to be used in a hands-free or speaker mode. Thus, a person with which the user is communicating can be heard via speaker holes 112.

A band 114 encircles telephone handset 100. Band 114 is made of a resilient material, preferably injection molded rubber. In the preferred embodiment, LOMOD™, a brand of rubber manufactured by GE Plastics, was used to construct band 114. In the preferred embodiment, band 114 is constructed as two separate bands—a left band and a right band. The left and right bands will be described in further detail below. When lower casing 102 and upper casing 104 are joined, band 114 forms a seal 115 therebetween. In an alternate embodiment, band 114 could be constructed as a single band that encircles the telephone handset 100. In a further alternate embodiment, band 114 could be a small strip of rubber that is attached along one side of lower casing 102.

In the preferred embodiment, band 114 is undermolded to lower casing 102. However, as would be apparent to those skilled in the art, band 114 could alternatively be attached to upper casing 104 via other processes (e.g., overmolding). Undermolding is an injection molding process which allows two or more separate plastic parts to be molded together to form one single, permanently bonded part (i.e., an integral part). This process requires various tools and molds. The first step is to use a set of tools to mold band 114 by injecting LOMOD™ into a mold. Once band 114 is dry, it is inserted into an undermolding tool (not shown). Pins 502 (discussed below in FIG. 5) on band 114 help to keep band 114 from moving within the undermolding tool. After closing the undermolding tool, lower casing 102 is molded by injecting CYCOLOY™ into the mold. The hot CYCOLOY™ melts a thin layer of the LOMOD™ band 114 and forms a permanent bond by mixing with some of the molecules that form band 114. Grooves 602 (discussed below in FIG. 6) help the injected plastic flow around and mold with band 114 during the undermolding process. Band 114 and lower casing 102 are then permanently bonded. The undermolding technology was developed by GE plastics. A more detailed explanation of undermolding can be found in a document available from GE Plastics, entitled "'Soft-Touch' Undermolding Program for AT&T Cordless Phone."

In another embodiment, lower casing 102 is overmolded to band 114. Using this method, lower casing 102 is formed by injecting plastic into a mold. Once lower casing 102 is dry, it is inserted into an overmolding tool (not shown). If using overmolding, lower casing 102 has grooves (not shown) and pins (not shown) molded with it. Once lower casing 102 is secured inside the overmolding tool, a hot rubber material is injected into the mold. The hot rubber material melts a thin layer of the plastic material which forms lower casing 102. This overmolding process forms a permanent bond between lower casing 102 and band 114.

A first button 116 and a second button 118 are molded with the resilient material that forms band 114. Accordingly, band 114, first button 116 and second button 118 are formed as one part (i.e., one unit). First button 116 and second button 118 combine to form a volume actuator. In another embodiment, a single button (not shown) could be used to actuate the electrical switch in place of the two buttons 116, 118 shown in FIG. 1.

In a preferred embodiment, first button 116 raises the volume of telephone handset 100 and second button 118 lowers the volume of telephone handset 100. In operation, the volume actuator engages an electrical switch or contact (not shown) that controls the volume. In the preferred embodiment, an AT&T designed switch, Part Number 406987073, supplied by Interface Data Systems, was used for the electrical switch.

Figure 2:
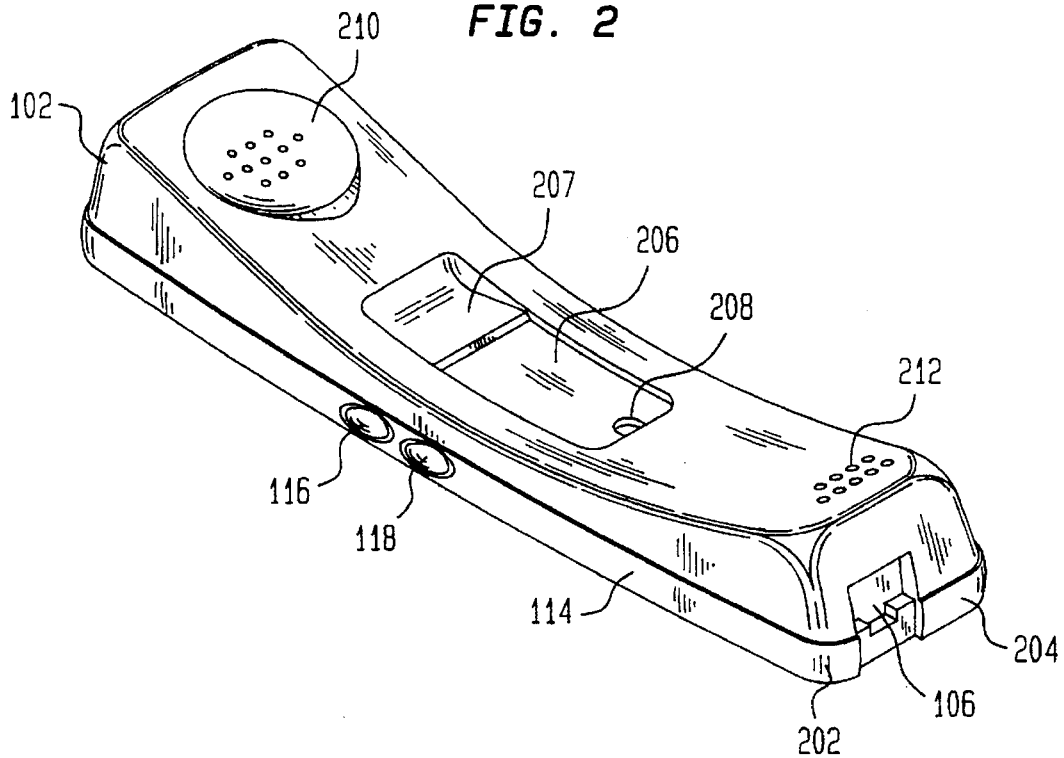
FIG. 2 is a bottom perspective view of the telephone handset.

FIG. 2 shows a bottom perspective view of telephone handset 100. A left half band 202 and a right half band 204 are shown attached to lower casing 102. Directory card holder 206 is formed in lower casing 102. An insert (not shown) covered by a piece of plastic (not shown) are inserted into directory card holder 206. The insert may contain information or telephone numbers important to the user. A female wedge member 207 is formed above directory card holder 206 in lower casing 102. When the user places telephone handset 100 onto a plastic base or transceiver unit (i.e., a stationary member) (not shown), female wedge member 207 connects with a corresponding male wedge member (not shown) on the stationary member and secures telephone handset 100 to the stationary member. A hole 208 for receiving a screw (not shown) is bored in lower casing 102. The screw is inserted into hole 208 to join lower casing 102 and upper casing 104.

Receiver holes 210 are formed in lower casing 102 above female wedge member 207. Receiver holes 210 travel through lower casing 102 and allow sounds emanating from a receiver assembly (not shown) to be heard by the user. Microphone holes 212 are formed in lower casing 102 below directory card holder 206. Microphone holes 212 allow sounds from the user's voice to transmit to a person at the other end of a communication.

Figure 3:
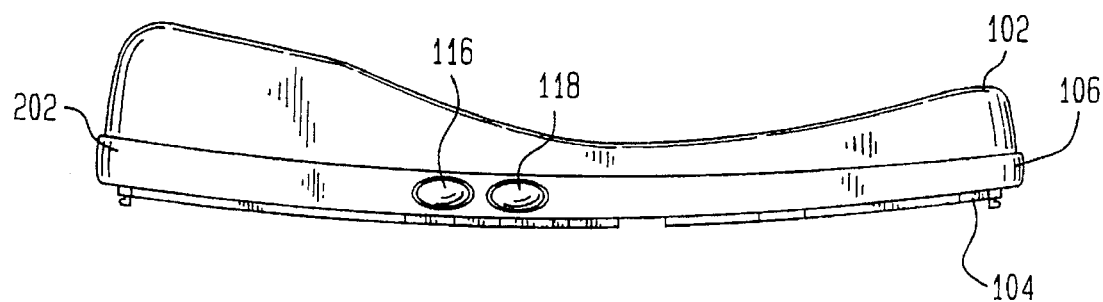
FIG. 3 is a side view of a lower casing of the telephone handset in FIG. 1.

FIG. 3 shows a side view of lower casing 102. In a preferred embodiment, the distance between the center of first button 116 and the center of second button 118 is approximately 16 mm, and first and second buttons 116, 118 are raised above band 114 by 1 mm. The length of telephone handset 100 is approximately 200 mm.

Figure 4:
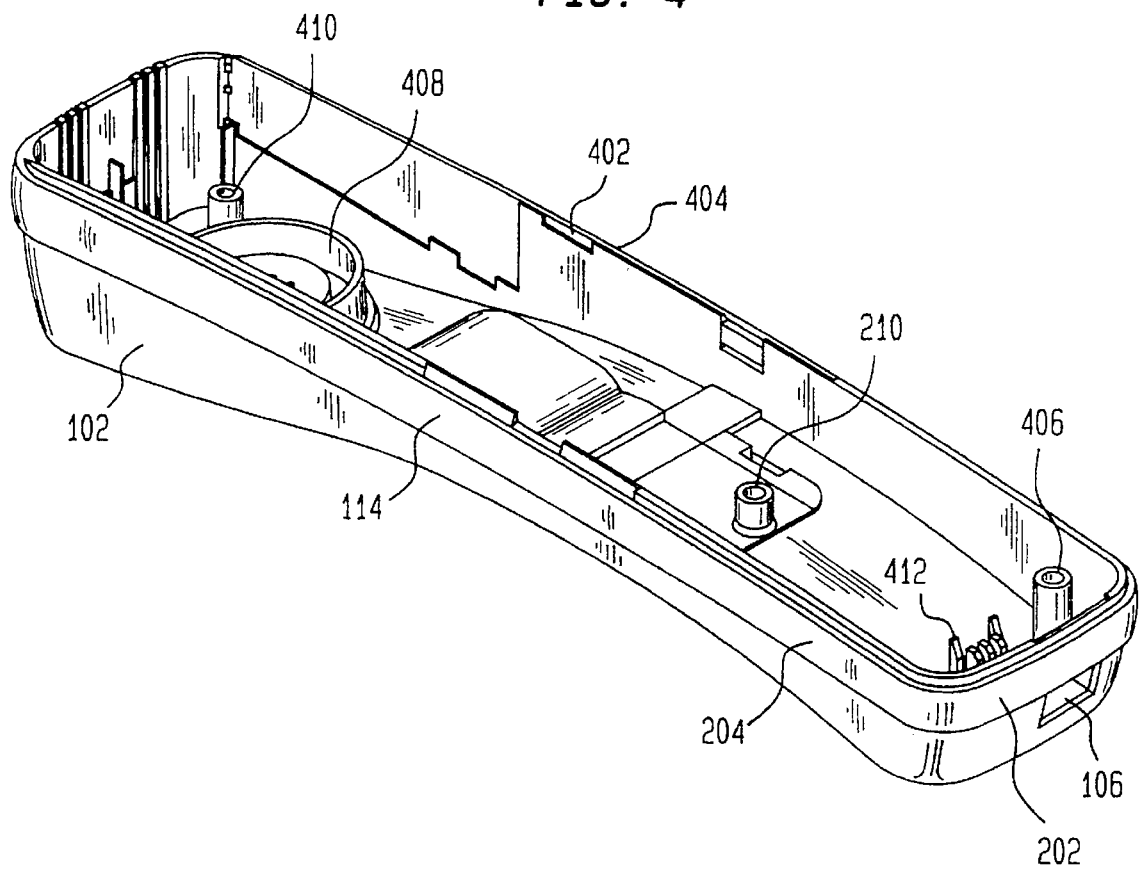
FIG. 4 is a perspective view of the lower casing of FIG. 3.

FIG. 4 shows a perspective view of lower casing 102 as shown in FIG. 3. A recess 402 is defined between lower casing 102 and band 114. In particular, as shown in FIG. 4, recess 402 is defined widthwise between an inner surface of the left half band 202 and an outer surface of a vertical wall of the lower casing 102. The electrical switch is housed in recess 402. In the preferred embodiment, recess 402 is located at an approximately middle point 404 along said left half band 202. When the user applies a force to first button 116 or second button 118, the resiliency of the material comprising band 114 allows the force to be transferred to the electrical switch housed in recess 402. This force actuates the electrical switch which controls the volume of telephone handset 100. A first hole 406 for receiving a pin (not shown) is molded with lower casing 102. The pin is molded with upper casing 104. When lower casing 102 and upper casing 104 are joined, first hole 406 and the pin from upper casing 104 mate and align the two parts during assembly. A receiver recess 408 is formed in lower casing 102. Receiver recess 408 holds the receiver assembly (not shown). A second hole 410 for aligning the receiver assembly is molded with lower casing 102. When the receiver assembly is inserted into lower casing 102 during assembly, a corresponding pin on the receiver assembly mates with second hole 410 to align the two parts. FIG. 4 also shows a clip 412. Clip 412 aligns a printed wiring board (not shown) during assembly. The printed wiring board is connected to a plug (not shown). Thus, when clip 412 aligns the printed wiring board, it also aligns the plug with plug opening 106.

Figure 5:
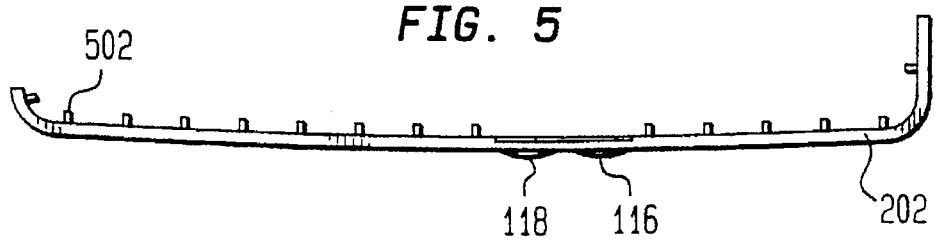
FIG. 5 is a top view of a left half band.
Figure 6:
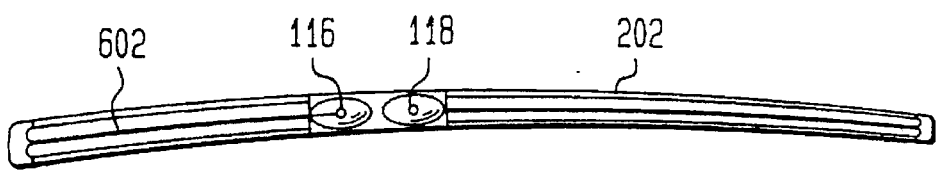
FIG. 6 is a side view of the left half band.
Figure 7:
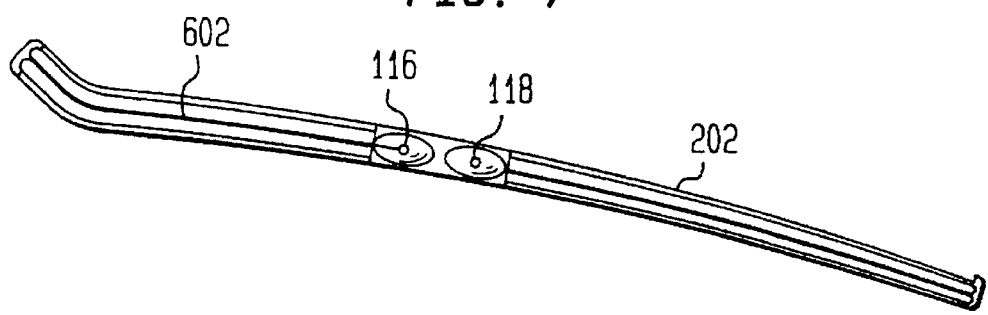
FIG. 7 is a perspective view of the left half band.

FIGS. 5–7 show a top, side and perspective view of left half band 202, respectively. Pins 502 are molded with the resilient material of band 114. In the undermolding process, pins 502 are used to secure band 114 in the undermolding tool while plastic material is injected into the mold. Grooves 602, as shown in FIG. 6, are molded with the resilient material of band 114 and are formed to improve the flow of the injected material during the undermolding process.

Figure 8:
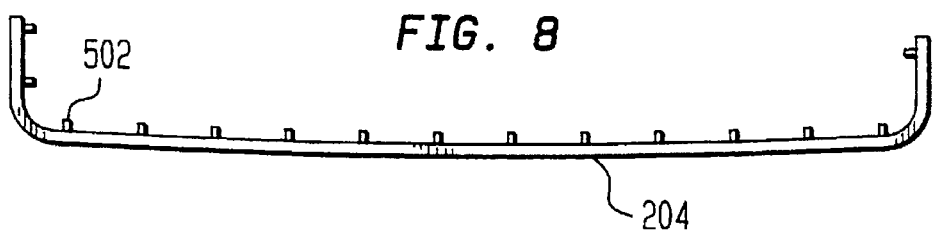
FIG. 8 is a top view of a right half band.
Figure 9:
FIG. 9 is a side view of the right half band.

FIGS. 8 and 9 show a top and side view of right half band 204, respectively. Pins 502 and grooves 602 are also molded with the resilient material forming band 114. In an alternate embodiment, right half band 204 could include the volume actuator.

In an alternate embodiment, the volume switch actuator could be incorporated into a handheld camcorder, a portable radio, a camera, a dictaphone and many other similar devices. Additionally, this invention is not limited to volume switch actuators. This invention can be used to incorporate many types of switch actuators into the above-mentioned devices.

While the invention has been particularly shown and described with reference to preferred embodiments thereof, it will be understood by those skilled in the art that various changes in form and details may be made therein without departing from the spirit and scope of the invention.

What is claimed is:

1. A telephone handset with an integrated actuator, comprising:

a first casing defining a periphery, said first casing having a length and a width;

a band of resilient material undermolded to said periphery of said first casing to be integral therewith, said band being molded with a resilient actuator, said band includes a plurality of spaced pins molded with said band, said pins extending from an inner surface of said band for engagement with an undermolding tool during undermolding, allowing said band to be secured and properly spaced in the undermolding tool while plastic is injected into a casing mold to form said first casing;

a second casing located adjacent said band and attached to said first casing, said band including said resilient actuator being located immediately between said first casing and said second casing;

a recess defined along at least a portion of said first casing periphery in a widthwise direction between said inner surface of said band near said actuator and an outer surface of said first casing; and an electrical switch disposed in said recess adjacent said actuator, said actuator being resiliently deformable by an external depressing force to contact and actuate said electrical switch.

2. The telephone handset of claim 1, wherein said band and said second casing form a seal therebetween.

3. The telephone handset of claim 1, wherein said recess is defined substantially at a middle point along the length of said first casing.

4. The telephone handset of claim 1, wherein said band comprises a first half band and a second half band, said first half band and said second half band each extending along lengthwise portions of the periphery of said first casing, at least one of said first half band and said second half band including said actuator.

5. The telephone handset of claim 4, wherein said recess is defined substantially at a middle point along the length of said first half band.

6. The telephone handset of claim 1, wherein said inner surface of said band includes one or more longitudinal grooves molded in said band for mating and bonding with said first casing during undermolding.

7. The telephone handset of claim 1, wherein said actuator comprises a first button and a second button for actuating said electrical switch.

8. An electronic device with an integrated actuator, comprising:

a first casing defining a periphery, said first casing having a length and a width;

a band of resilient material undermolded to said periphery of said first casing to be integral therewith, said band being molded with a resilient actuator, said band includes a plurality of spaced pins molded with said band, said pins extending from an inner surface of said band for engagement with an undermolding tool during undermolding, allowing said band to be secured in the undermolding tool while plastic is injected into a casing mold to form said first casing;

a second casing located adjacent said band and attached to said first casing, said band including said resilient actuator being located immediately between said first casing and said second casing;

a recess defined along at least a portion of said first casing periphery in a widthwise direction between said inner surface of said band near said actuator and an outer surface of said first casing; and an electrical switch disposed in said recess adjacent said actuator, said actuator being resiliently deformable by an external depressing force to contact and actuate said electrical switch.

9. The electronic device of claim 8, wherein said band and said second casing form a seal therebetween.

10. The electronic device of claim 8, wherein said recess is defined substantially at a middle point along the length of said first casing.

11. The electronic device of claim 8, wherein said band comprises a first half band and a second half band, said first half band and said second half band each having a length and extending along lengthwise portions of the periphery of said first casing, at least one of said first half band and said second half band including said actuator.

12. The electronic device of claim 11, wherein said recess is defined substantially at a middle point along the length of said first half band.

13. The electronic device of claim 8, wherein said inner surface of said band includes one or more longitudinal grooves molded in said band for mating and bonding with said first casing during undermolding.

14. The electronic device of claim 8, wherein said actuator is a volume actuator.

* * * * *